United States Patent

[11] 3,570,369

[72] Inventors William M. Hoddinott
  Milford;
  Leonard Nelson, Trumbull, Conn.
[21] Appl. No. 831,099
[22] Filed June 6, 1969
[45] Patented Mar. 16, 1971
[73] Assignee said Hoddinott assor to Textron Inc.
  Providence, R.I.

[54] TOOL-CARRYING TURRET
  7 Claims, 3 Drawing Figs.
[52] U.S. Cl. ........................................... 90/16,
  90/17, 29/39
[51] Int. Cl. .......................................... B23c 1/12
[50] Field of Search ............................... 90/16, 17;
  77/27; 29/564, 40, 39

[56] References Cited
UNITED STATES PATENTS
| | | | |
|---|---|---|---|
| 2,868,086 | 1/1959 | Gunderson.................. | 90/16 |
| 2,963,944 | 12/1960 | Straus.......................... | 90/17 |
| 3,452,642 | 7/1969 | Balding ....................... | 90/17 |

Primary Examiner—Gill Weidenfeld
Attorney—Johnson & Kline

ABSTRACT: A simple, rugged turret for milling machines embodying slidable cross arms or rams carrying four different tools, preferably power-operated tools which can, by adjusting the position of the cross arms, be selectively employed on a workpiece carried by a worktable of the milling machine, all without altering the setup of the workpiece.

Patented March 16, 1971

3,570,369

2 Sheets-Sheet 1

INVENTORS
William M. Hoddinott
Leonard Nelson
BY

Johnson and Kline
ATTORNEYS

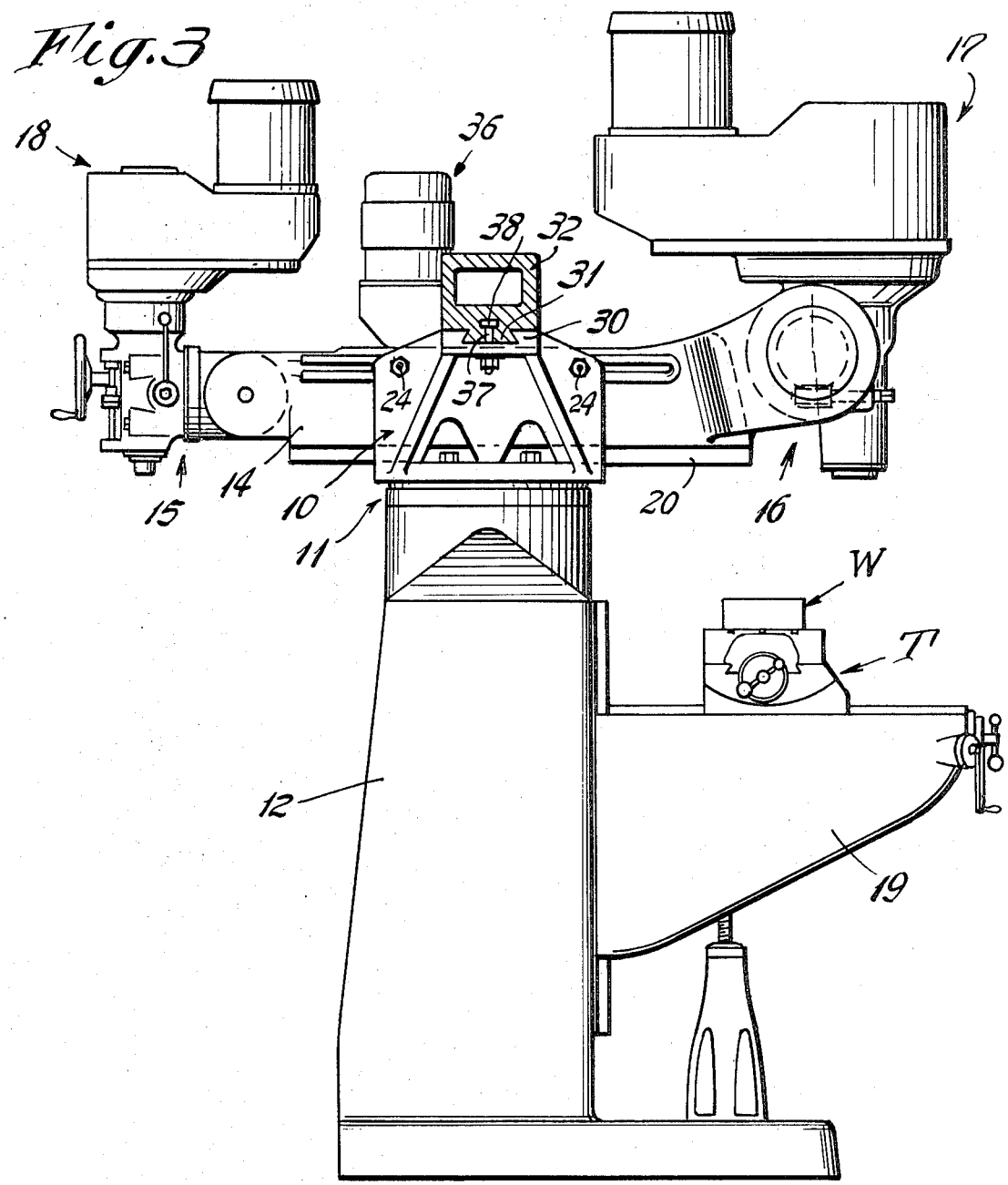

TOOL-CARRYING TURRET

Heretofore, in processing a workpiece, such as a die, it has been the practice to set the workpiece up on a different machine to carry out each of the various operations, such as roughing, finish milling, cherrying, a rotary milling or the like, and this entailed considerable handling of the die and consumed much time.

The present invention overcomes these difficulties by providing on the ortary turret of a milling mchaine or the like a rigid housing slidably carrying adjustable crossarms or rams, said corssarms or rams carrying at each end a tool, preferably a power-operated tool, capable of performing a different operation on the workpiece set up on the table. The housing which is out of round, and preferably rectangular in cross section, slidably encloses one ram and has transverse ways slidably carrying the other ram for movement at right angles to the housing. The rams can be locked in adjusted position by simple clamping means.

Figure 1:
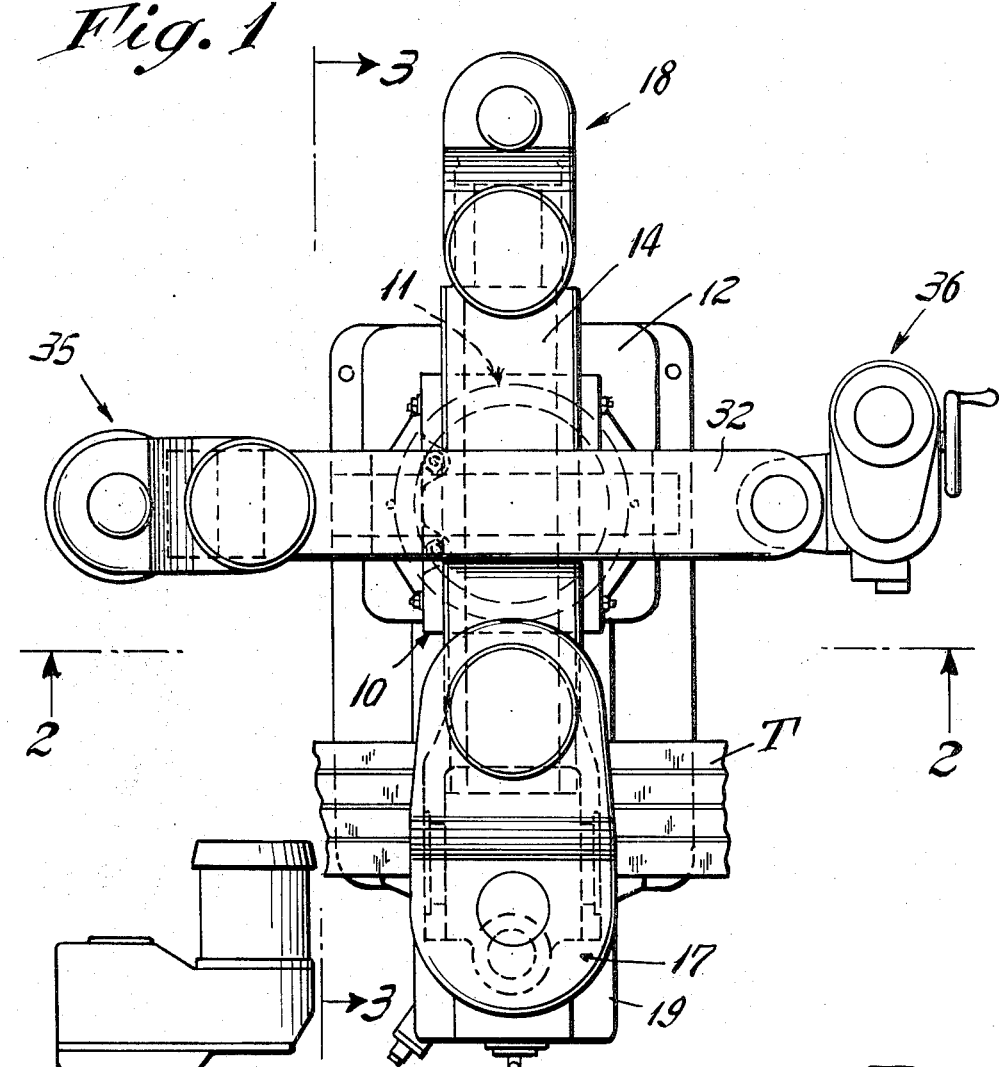
Figure 2:
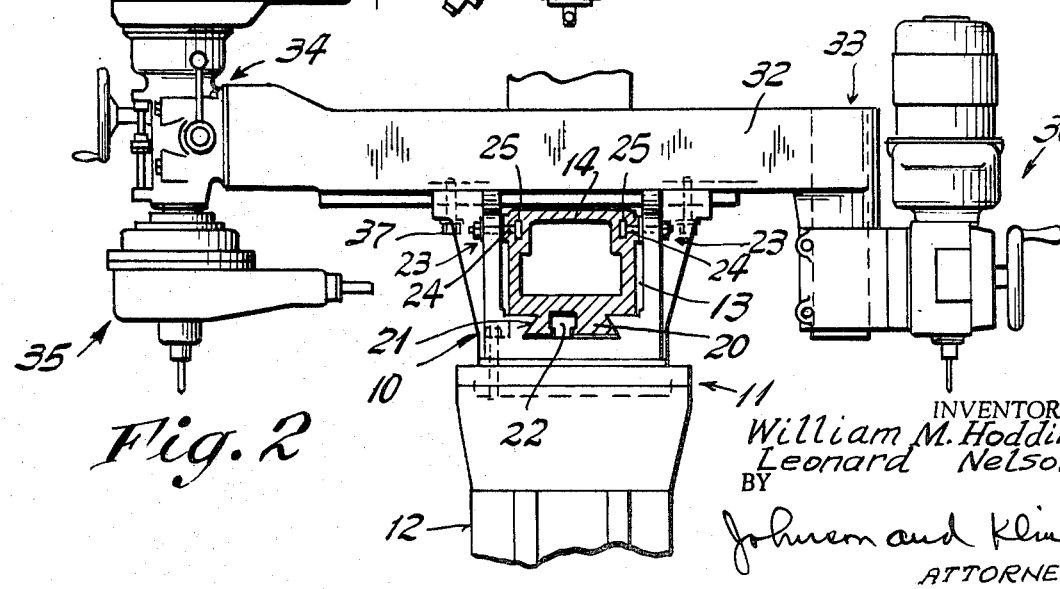

Other features and advantages of the invention will be apparent from the specification and claims when considered in connection with the accompanying drawings in which:

FIG. 1 is a plan view of the present invention.
FIG. 2 is a view taken along line 2–2 of FIG. 1.
FIG. 3 is a view taken along line 3–3 of FIG. 1.

As shown in the drawings the present invention comprises a housing 10 mounted on an adjustable rotatable base 11 secured to the end of a standard 12 of a milling machine. The housing has an out-of-round through bore 13 (FIG. 2), preferably rectangular in cross section, slidably carrying a first crossarm or ram 14. The crossarm or ram 14 has tool mounting portions 15, 16, one at each end to receive and mount a tool thereon. Preferably the tools are different power-operated tools 17, 18, which, by rotating the base and sliding the crossarm or ram in the housing, can be positioned in opposite relation with a workpiece W, such as a die carried by a work-supporting table T adjustably mounted on the knee 19 of a milling machine.

The crossarm or ram 14 has a split dovetailed slide 20 received in ways 21 on the housing and locked in position by locking means 22 (FIG. 2) as is disclosed in the Bannow U.S. Pat. No. 2,831,237. Also, the housing and crossarm have additional clamping means for clamping the crossarm in adjusted position. This means is shown in FIGS. 2 and 3 at 23 and comrpises a headed bolt 24 mounted on the housing with the head in a slot 25 in the side of the crossarm or ram 14 and locked in adjusted position by the clamping bolts. The housing also has provided on the top thereof transverse ways 30. The ways cooperate with the dovetailed slide 31 of a second crossarm or ram 32 which is preferably rectangular in shape. The crossarm is slidably adjustable in the ways and has tool-mounting protions 33, 34, one at each end to receive and mount a tool thereon. The tools, as herein illustrated, are a rotary milling attachment 35 and a cherrying attachment 36. The crossarm or ram 32 is disposed transversely of the housing and preferably at 90° with respect to said first crossarm. It is clamped in adjusted position by headed bolts 37 carried by the housing with the head disposed in a slot 38 in the arm.

The turret of the present invention is rugged, simple and easily operated, preferably with the elements carried by a rigid housing. The tools are carried thereby in 90° spaced relation. By selectively adjusting the position of the tools carried by the crossarms so that they are in cooperative relation with the workpiece W on the table, such as die or the like, all operations can be performed thereon to produce the required shaping thereof in a single machine, thus eliminating the necessity of moving the workpiece from machine to machine to perform each operation with the attendant loss of time required for setup and the handling incident to such movement.

Variations and modifications may be made within the scope of the invention and portions of the improvements may be used without others.

We claim:

1. A tool-carrying turret for use on a milling machine or the like having a work-supporting table, said turret comprising a rotatable base mounted on said machine, a rigid housing secured to said base, a first ram slidably mounted in said housing and having portions projecting at each end provided with tool-mounting portions, said housing having transverse ways, a second ram transversely disposed with respect to the first ram and slidably mounted on said ways and having tool mounting portions at each end whereby different tools can be mounted on each of said tool mounting portions and can be selectively adjusted and moved into operative relation with work on said work-supporting table.

2. The invention as defined in claim 1 wherein the tools are power-operated tools.

3. The invention as defined in claim 1 wherein said transverse ways support the second ram at right angles with respect to said first ram whereby the power-operated tools are disposed 90° apart on the turret.

4. The invention as defined in claim 1 wherein the rams are hollow and have a rectangular cross section.

5. The invention as defined in claim 1 wherein the transverse ways are located on the top of the housing and support the second ram above the first ram.

6. The invention as defined in claim 1 wherein each of the rams has a dovetail slidable connection to said housing.

7. The invention as defined in claim 1 wherein there are clamping means for securing each ram to the housing in the adjusted position of said rams.